United States Patent [19]

Brooks et al.

[11] 4,096,236
[45] Jun. 20, 1978

[54] GAS SCRUBBING METHOD

[75] Inventors: Richard J. Brooks, Seattle; Burton Brooks, Bellevue, both of Wash.

[73] Assignee: The Chemithon Corporation, Seattle, Wash.

[21] Appl. No.: 746,681

[22] Filed: Dec. 2, 1976

Related U.S. Application Data

[63] Continuation-in-part of Ser. No. 393,192, Aug. 30, 1973, abandoned.

[51] Int. Cl.² ............................................. B01D 53/34
[52] U.S. Cl. .................................. 423/210; 423/242; 55/87; 55/241; 261/112
[58] Field of Search .............. 423/210, 232, 234, 242, 423/245, 215.5; 261/112; 55/240, 87, 241

[56] References Cited

U.S. PATENT DOCUMENTS

| | | | |
|---|---|---|---|
| 706,115 | 8/1902 | Rulf | 261/112 |
| 1,132,679 | 3/1915 | Murray et al. | 423/242 |
| 1,268,100 | 6/1918 | Dreffein | 261/112 |
| 2,113,198 | 4/1938 | Nonhebel et al. | 423/242 |
| 2,169,369 | 8/1939 | Osterloh et al. | 55/87 X |
| 3,427,342 | 2/1969 | Brooks et al. | 260/458 |
| 3,755,990 | 9/1973 | Hardison | 423/210 X |
| 3,839,548 | 10/1974 | Jackson | 423/234 X |
| 3,841,061 | 10/1974 | Pike | 55/223 |

Primary Examiner—Earl C. Thomas
Attorney, Agent, or Firm—Merriam, Marshall & Bicknell

[57] ABSTRACT

A scrubbing system including scrubbers having straight through or direct line gas flow, with steam pretreatment of the gases supplied to the scrubber. The scrubbing solution may be recycled. Where steam is present in the process, the effluent gas is partially recycled to the process upstream of the scrubber to maintain a predetermined level of steam moisture in the gases entering the scrubber.

15 Claims, 6 Drawing Figures

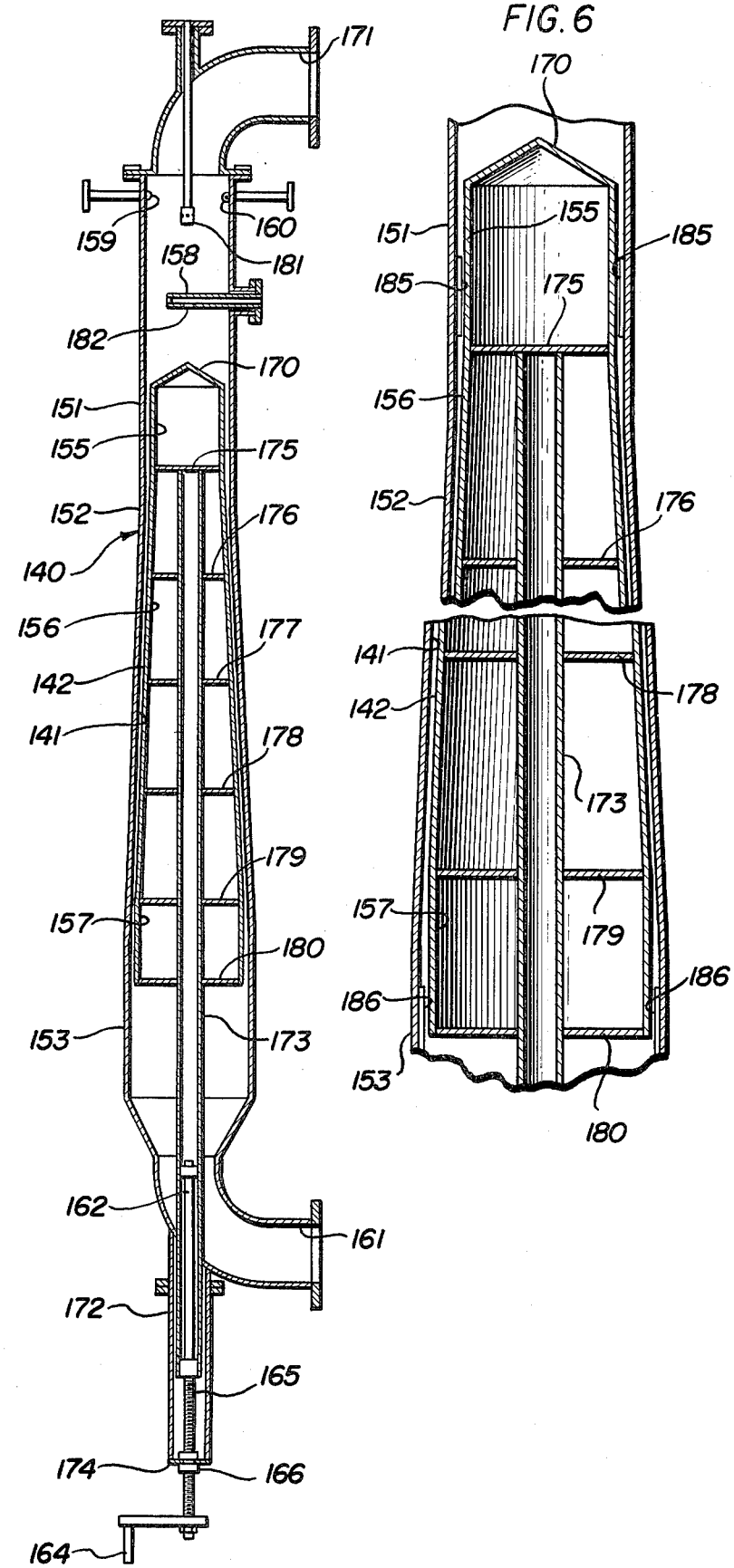

GAS SCRUBBING METHOD

RELATED APPLICATION

This is a continuation-in-part of Ser. No. 393,192 filed Aug. 30, 1973, and now abandoned.

BACKGROUND OF THE INVENTION

The present invention relates to a method for scrubbing the effluent gases of various processes and is concerned more particularly with the scrubbing of fumes and particles from the gases from processes.

BRIEF DESCRIPTION OF THE PRIOR ART

A variety of scrubbing processes and scrubbing devices have been employed in attempts to remove solid particulates and fumes from industrial gases. These have included a great number of designs incorporating either packed or moving beds of loose solids, planar or curved baffles, such as helices or other members within scrubbing chambers. Several types of inlets and distributors for scrubbing solutions have been tried for presenting a wetted surface to the incoming gases.

Previous methods of scrubbing gases with such scrubbers generally have tended in the direction of drowning the gases and the scrubber itself with the maximum amount of scrubbing solution that could be crowded into the system. This has resulted in extreme power costs and extreme pressure-drops but not necessarily increased effectiveness in cleaning the gases.

For example, U.S. Pat. No. 3,141,910 relies on a wetted baffle which typifies the flow-interference to be encountered with baffles arranged transverse to the gas flow.

U.S. Pat. No. 3,181,287 is an example of transverse baffles which are aerodynamically designed in an attempt to provide a controlled flow.

U.S. Pat. No. 3,626,672 combines a loose-media scrubbing zone and flow-directing, baffle-type scrubbing, along with a recycle of the scrubbing solution.

While certain of the prior scrubbing methods and scrubbers have been found to be workable and useful in cleaning gases, they have not been found entirely satisfactory in terms of their capital and operating costs for the actual effects which they accomplish.

SUMMARY OF THE INVENTION

In general, the preferred method of the present invention incorporates the addition of steam to the effluent gases before they enter the scrubbing zone and the modification and control or regulation of the composition of the scrubbing solution which preferably is recycled to the scrubbing zone after separation of the pollutants trapped therein.

In general, the preferred form of scrubber of the present invention provides closely-adjacent, wetted facing surfaces, preferably in the form of an annulus, which receive the stream of effluent gas mixed with steam and conduct the mixture a predetermined distance in contact with the scrubbing solution which is spread on the surfaces as films.

OBJECTS OF THE INVENTION

Accordingly, it is an object of the invention to provide for the scrubbing of gases with optimum efficiency and with a minimum operating cost.

It is another object of the invention to treat effluent gases containing acid components and to recover such acid components as either harmless waste or useful products.

A further object of the invention is the conservation of the efficiency of a scrubbing process when it encounters components of the effluent gases which exhibit difficult physical properties under scrubbing conditions.

Another object of the invention is the provision of a closed, recycling scrubbing system which maintains the efficiency thereof in association with processes such as spray drying.

A further object of the invention is the provision of a scrubber which provides for maximum contact between the pollutants in the effluent gases and the scrubbing solution on the wetted surfaces of the scrubber and with an optimum pressure-drop across the scrubber.

BRIEF DESCRIPTION OF THE DRAWINGS

Other objects and advantages of the invention will be understood from the following description and accompanying drawings, in which:

FIG. 5 is a vertical sectional view of a further embodiment of the present invention; and FIG. 6 is an enlarged fragmentary view of the embodiment of FIG. 5.

DETAILED DESCRIPTION

Figure 1:
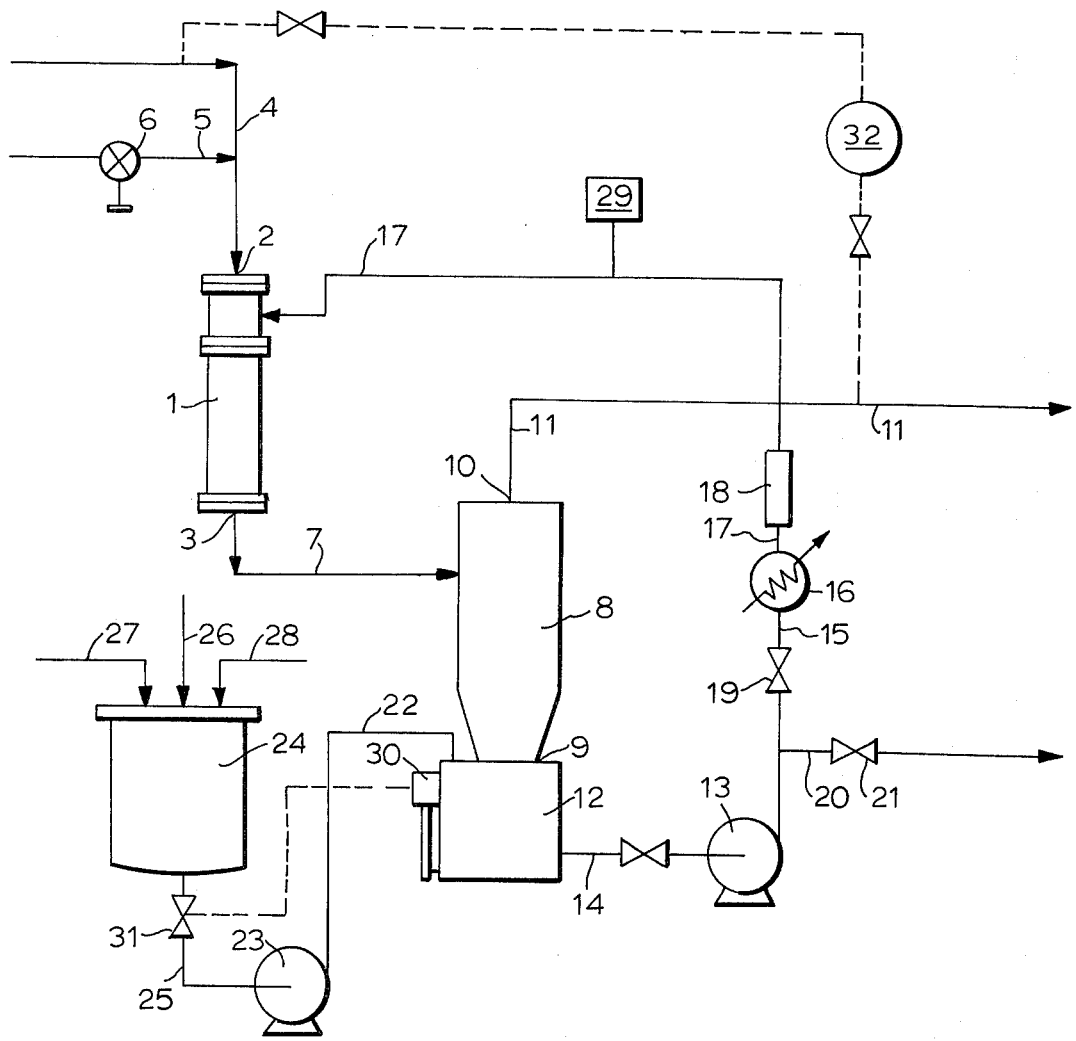
FIG. 1 is a schematic of a scrubbing process.

As shown in FIG. 1, the scrubbing system of the present invention includes a scrubber receiving effluent gases from a detergent sulphonation process. The scrubber 11 includes a gas inlet 2 and a gas-liquid outlet 3. The gas inlet 2 receives the effluent gases via a line 4 leading from the sulphonation process. The line 4 receives steam via a branch line 5 which is controlled by a valve 6.

The scrubber outlet 3 is connected to a line 7 which leads to a suitable gas-liquid separator 8 which has a liquid outlet 9 and a gas outlet 10. Gas discharging from the outlet 10 is lead to the atmosphere via a line 11.

The liquid discharging via outlet 9 of the separator 8 discharges to a liquid receiver 12, from which it is pumped by means of a pump 13 and a line 14 to a heat exchanger 16 via pipes 15. From the heat exchanger 16, the scrubbing solution is delivered to the scrubber via line 17. Preferably, the rate of flow of liquid through the heat exchanger 16 and line 17 and to the scrubber is monitored by means of a flow indicator 18 and is regulated by means of a valve 19 in the line 15 intermediate the pump 13 and heat exchanger 16. Intermediate the pump 13 and the valve 19, the line 15 has a branch line 20, which is controlled by a valve 21 and leads either to disposal or to another point in the overall process.

The liquid receiver 12 receives make-up and corrective solution via a line 22 which is served by a pump 23 which communicates with the make-up tank 24 by means of a line 25. The make-up tank 24 receives water via line 26, a reagent such as a 50% sodium-hydroxide solution via a line 27 and a supplemental conditioning agent such as a defoaming soap via a line 28.

Preferably, the addition of reagents is either manually or automatically controlled in conjunction with a pH indicator 29 which senses the pH of the solution flowing through the line 17 to the scrubber.

The control of the overall volume of liquid preferably is effected by a level control means 30 associated with the receiver 12 which is in controlling communication with a valve 31 in the line 25 between the tank 24 and the pump 23.

Overall monitoring of the gas flow through the system is effected by means of a pressure differential indicator 32 which is connected across the effluent gas intake line 4 and the cleaned gas exhaust line 11.

In operation, effluent gases from the process are delivered to the scrubber via the line 4 after receiving a measured flow of steam through the branch line 5. Within the scrubber, the gases, particulates and fumes encounter the scrubbing solution which has been distributed across the wet surfaces within the scrubber.

Particles which are preagglomerated by the steam entering through line 5 then encounter the film of scrubbing solution on those surfaces and are trapped in the solution as it exits the scrubber via the outlet 3 enroute to the separator 8. Vapors, fumes and gases which are entrained in the effluent gas stream similarly are presolved and encounter the scrubbing solution and are either trapped therein or react therewith to join the discharging stream of liquid.

In the system shown, in which the effluent gas is received from a detergent sulphonator, and the reagent solution is sodium hydroxide, the problem of supplemental or extraneous detergent-formation, with a consequent foaming of the scrubber solution, is encountered. To accommodate this, a form of soap such as tall oil is added to the scrubbing solution via the line 28 at make-up tank 24 to kill the foaming and bubbling tendency of the very dilute detergent solution which is formed in the scrubbing solution recycle.

Where substantial amounts of detergent are formed in this process, such detergent can be bled off at 21, along with sodium sulphite which is formed in the reaction of sulphur dioxide and sodium hydroxide in the scrubbing cycle, and both can be recovered in the detergent-making process.

In treating effluent gases from a sulphur trioxide sulphonator, it is likely that sulphuric acid, sulphonic acid, stray hydrocarbons and other contaminants will be encountered in addition to the sulphur dioxide gas expected. Therefore, we prefer that the scrubbing solution be kept above pH value of 8, at the very lowest, and find it most advantageous to maintain the pH of the scrubber solution at a value of about 10. With the system shown on FIG. 1, this is quite readily accomplished by the manual or automatic addition of the 50% sodium hydroxide solution, at the makeup tank 24, in reaction to the indication or signal from the pH indicator 29.

We have found that the addition of steam through line 5 is effective within the range of from 0.1 lbs. to 0.9 lbs. of steam per 100 cubic feet of gas received via the line 4. The most advantageous rate of steam introduction for any given gas is a factor of the concentration, nature, and physical properties of the pollutants to be removed from the gas, and is best determined empirically within the range given above.

The heat exchanger 16 is employed to maintain the scrubbing solution at a temperature which will condense the steam from the inlet 5 within the scrubber and while it is within the region of the wetted surfaces of the scrubber, in order to maximize the separation of the particles and the condensed steam from the gas stream.

Preferably, the temperature of the scrubbing solution is maintained below 120° F to accomplish this condensation of the stesam. Further, we have found a flow rate of between 20 and 80 pounds per minute of scrubber solution per square foot of scrubber surface to be effective in the system of FIG. 1. However, with lower efficiency scrubbers than that described hereinafter, greater rates of scrubber solution and steam introduction may be necessary.

It is to be understood that it is also possible to use reagents other than sodium hydroxide in the scrubbing solution. In the cases in which acid components are encountered in the gas, other alkaline solutions such as lime slurries, caustic sodas, ammonias and the like may be employed. Also, it is to be understood that the sytem may be operated on a single flow of the scrubbing solution, in which the solution is continuously supplied at a metered rate of flow to the solution inlet of the scrubber and is thereafter removed from the system without recycle.

The effectiveness of the system is sensitive to a number of factors, including the relative amount of steam which is added to the gas before it enters the scrubber, the relative amount of scrubbing solution which is supplied to the scrubber for exposure to the gas, the degree of alkalinity of the scrubbing solution, the total of wetted-surface area of the scrubber, and the pressure drop across the scrubber itself. Also, the cross-sectional area available for the flow of the gas and of the scrubber solution therethrough, as well as the volume of gases and the pressure drop across the system, are pertinent variables. Therefore, it is of distinct advantage to maintain a relationship, between the cross-sectional area available for flow and the gas velocity, at relatively constant values. Also, the total amount of wetted-surface area should be kept in proportion. The preferred values for these factors will be discussed more fully hereinafter with regard to the scrubber of FIG. 2.

Where desired, or where it proves convenient for any reason, the addition of a defoamer to the recycling scrubber solution may be replaced by employing a controlled, high rate of removal and make-up of the alkaline solution. When the concentration of the alkaline solution drops below a range at which foaming might be initiated, the depleted caustic or other alkali, along with the formed detergent, may be discharged to the detergent process with the appropriate addition of fresh amounts of alkali to maintain the desired pH. This will maintain a degree of control against foaming in cases in which insufficient solids are maintainable in the recycle of the scrubbing solution and particularly in cases in which the condensation of the steam tends to overly-dilute the scrubbing solution.

In the use of the system in conjunction with a detergent sulfonator, we have found that it is advantageous to maintain a solid-particle concentration in the solution recycle system in the order of between 5 and 15%. The solids may include either precipitated salts or particles originally entrained in the effluent gases, or both. It has been found that with such solids concentration, the efficiency of the scrubbing solution is maintained, as long as the pH is properly regulated, while the presence of the solids tends to depress the foaming tendency of the detergents which are formed, even when they fall within the dilute range causing the foaming of such detergents.

Figure 2:
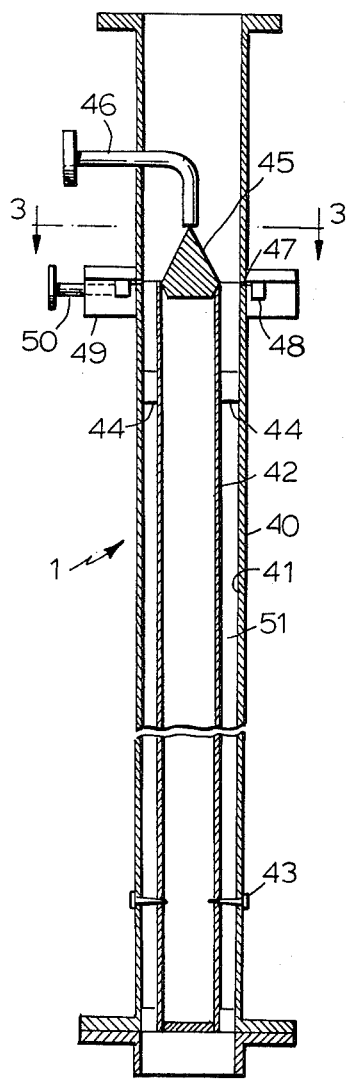
FIG. 2 is a vertical sectional view of one embodiment of a scrubber in accordance with the present invention.
Figure 3:
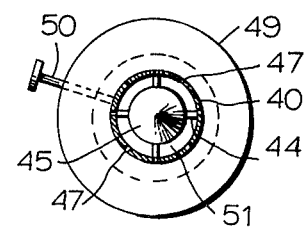
FIG. 3 is a sectional view taken along line 3—3 of FIG. 2.

As shown in FIGS. 2 and 3, the preferred form of scrubber includes an elongated, vertically disposed main casing or duct 40, which may be in a form of a pipe, and which has a cylindrical inner surface 41. Concentric with the cylindrical surface 41, a member forming a cylindrical inner wall 42 is mounted within the pipe 40 by suitable mounting means such as bolts 43. The inner wall 42 carries radial vanes 44 which bear against the outer wall 41 and maintain the concentricity of the two facing surfaces which define therebetween an unobstructed, vertically extending annular flow path.

As shown in the figures, the disposition of the two facing surfaces of the annular flow path is substantially parallel along both a vertical cross-section (FIG. 2) and a horizontal cross-section (FIG. 3).

The scrubber thus provides an annulus or annular scrubbing chamber 51 formed between two separate, discrete, vertically extending, horizontally spaced, concentric inner and outer facing surfaces or walls 42 and 41, respectively.

At its upstream end, the inner wall 42 is provided with a conical distributing plug 45 toward which scrubbing solution is directed by means of scrubbing-liquid inlet branch 46 which is bent internally of the casing 40 to be aligned axially with the apex of the cone 45. In the region of the transition from the cone 45 to the cylindrical surface of the inner wall 42, the casing 40 is provided with a plurality of radial apertures 47. The apertures 47 are surrounded by a plenum chamber 48 formed in a flange member 49 surrounding the casing 40 and which receives scrubbing solution from a second branch of the scrubbing liquid inlet 50. Distributing plug 45 and apertures 47 cooperate to provide a descending film of scrubbing liquid on each of the facing surfaces 41, 42 of the annular flow path from substantially the top to the bottom of the flow path, the surfaces 41, 42 each forming a backing for its respective film. The gas is scrubbed by the facing films of liquid as the gas flows downwardly therebetween from above the scrubbing liquid. Substantially the entirety of the scrubbing operation is conducted along the unobstructed flow path defined by the facing films, a flow path substantially devoid of directional change, there being substantially no further scrubbing action downstream of the bottom of facing surfaces 41, 42.

We have found that such annular chambers are particularly effective for direct line scrubbing when the spacing between the concentric inner and outer walls or facing surfaces falls in the range of from 0.25 to 1.5 inches and, preferably, within the most advantageous range of from 0.4 to 1.0 inches, while the length of the direct line flow path is maintained between 2 feet and 6 feet, as set forth more fully hereinafter.

Where the spacing between facing surfaces of the direct line scrubbing chamber is less than 0.25 inches, the pressure-drop across the scrubber becomes so high that the advantages of the direct line flow are sufficiently reduced as to detract from the operational value of the scrubber.

Where the spacing between facing surfaces is greater than 1.5 inches, there is too much free area for the gases to flow through. Apparently, the spacing between the facing surfaces is then greater than is necessary for the intimate, concurrent flow of gases and scrubbing solution produced by those chambers having spacings which are within the ranges set forth above.

In addition, we have found that the length of the scrubbing chamber or flow path preferably is maintained in the range of from 1½ feet to about 10 feet in length.

Where scrubbing chambers of our preferred type and less than 2 feet are employed, the pressure-drop thereacross is prohibitive in comparison with the scrubbing effect achieved.

Also, if the length of our scrubbing chamber is increased significantly beyond 6 feet or, at most, beyond 10 feet, the resulting difference in scrubbing effect is negligible.

EXAMPLE - Scrubber of FIG. 2

A scrubber in accordance with FIG. 2 was made with a scrubbing chamber of the following dimensions:
ID outer wall - - - 4.0 inches
OD inner wall - - - 3.6 inches
radius of annulus - - - 0.4 inches
length of chamber - - - 6 feet with the annular scrubbing chamber having a radius or spacing between facing surfaces of 0.4 inches, its cross-sectional area is 5.03 in.$^2$. The wetted-wall area is about 12 ft.$^2$.

This scrubber was tested in a sulfonation system in accordance with the disclosure of FIG. 1, and received:
Gas flow (steady) - - - 280 scfm
Scrubber solution (maintained at pH 8) - - - 7-15 gpm
Steam pretreat - - - 50-150 lbs/hr The scrubber of our invention effectively removed pollutants from the gas to a ppm value lower than the acceptable value effected by the scrubber previously installed in the system. Moreover, our scrubber not only exceeded the gas-cleaning ability of the 1 ½ inch venturi scrubber it replaced, but also performed at the improved level through a lower range of pressure-drops thereacross (4 to 6 inches Hg) than the 12 inch Hg drops required to obtain adequate gas cleaning from the venturi scrubber. Therefore, it is apparent that the uncomplicated straight-through or direct-line scrubber of FIG. 2 achieves an excellent scrubbing efficiency, even when compared to a reasonably uncomplicated venturi scrubber. The advantages over the complex, diverting-baffle or permeable-bed scrubbers are even greater.

Figure 4:
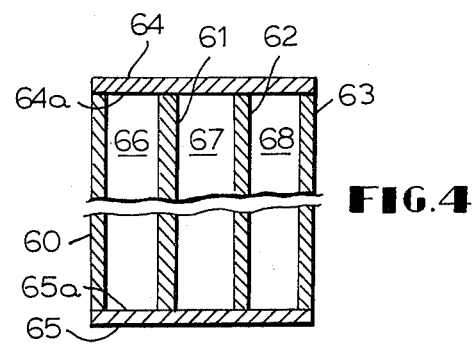
FIG. 4 is a horizontal cross-sectional view of another embodiment of a scrubber in accordance with the present invention.

The modified form of the preferred scrubber chamber shown in FIG. 4 includes mutually-parallel, wetted walls or facing surfaces analogous to the inner and outer walls of the annular chamber of FIGS. 2 and 3.

However, instead of being wrapped into an annulus, the walls 60–63 are planar and the edge spaces therebetween are closed by end walls 64 and 65 to form three chambers 66, 67 and 68.

The internal portions of all the walls, including the end walls 64 and 65, are wetted with scrubber solution.

The chambers 66–68 are each similar in dimensions to the annular chamber 51. That is, each chamber is about 0.4 inches by about 12 inches (the circumference of the wall 41 of FIG. 3 is about 12.57 inches). However, as a result of the presence of the end walls, such as 64a and 65a in chamber 66, each chamber presents a slightly greater area of wetted-wall surface than does an annulus.

The chambers 66–68 are formed in a length similar to that of the scrubber of FIG. 2 in the preferred range of from 2 to 6 feet.

In operation, with scrubber solution sprays, not shown, for wetting the facing surfaces of chambers 66–68, scrubbers constructed in accordance with FIG. 4 are analogous in performance to those constructed in accordance with FIG. 2, where dimensions are similar and the service is equivalent.

Referring now to FIGS. 5 and 6, there is shown an embodiment of an annular scrubbing apparatus in which the spacing between the facing surfaces of the annulus can be adjusted. An elongated, vertically disposed main casing or duct 140 comprises an outer member 141 and an inner member 142 constituting a pair of separate, discrete, vertically extending, horizontally spaced, facing surfaces defining therebetween an unobstructed, vertically extending flow path in the form of an annulus. Outer member 141 comprises a cylindrical upper portion 151, an intermediate, frusto-conical main portion 152 and a cylindrical lower portion 153. Inner member 142 comprises a cylindrical upper portion 155, a frusto-conical main portion 156 and a cylindrical lower portion 157. A steam nozzle 181 is located inside duct 140 near the top thereof.

Scrubbing liquid is introduced onto the outer surface of inner member 142, at the top thereof, by a nozzle 158 having an aperture 182 located above a conical distributing cap 170 on the top of inner member 142. Scrubbing liquid is introduced onto the inner surface of outer member 141, at the top thereof, by a pair of diametrically opposed nozzles 159, 160 located at the periphery of cylindrical upper portion 151 on the outer member. As a result, a descending film of scrubbing liquid is formed on each of the facing surfaces defining the annular flow path, from the top to the bottom thereof, a flow path substantially devoid of directional change. Effluent gases are scrubbed by flowing a stream of gas through inlet 171, at the top of duct 141, downwardly from above scrubbing liquid along the flow path between the liquid films on the facing surfaces. Communicating with the bottom of duct 140 is an outlet elbow 161 for removing gas and scrubbing liquid from the duct.

An elongated member 173 is fixed inside inner member 141 by plates 175–180 and extends downwardly therefrom through elbow 161. The lower portion of members 173 is fixed to a rod 162 partially enclosed within a tube 172 and terminating at a crank handle 164. A lower portion 165 of rod 162 is threaded and engages within a nut 166 fixed to the bottom end 174 of tube 172. Turning crank handle 164 raises or lowers rod 162, elongated member 173 and inner member 141 to increase or decrease the spacing between the frusto-conical main portions 152, 156 of the two members 141, 142 defining the annulus. The spacing between facing surfaces of the flow path can thus be adjusted within the range defined by the pre-selected maximum and minimum spacings noted above, i.e., 0.25 inches – 1.5 inches (0.4 inches – 1.0 inches preferred).

Attached to cylindrical lower portion 153 of outer member 141, opposite cylindrical lower portion 157 of inner member 142, are lower guide strips 186, and attached to cylindrical upper portion 151 of outer member 141, opposite cylindrical upper portion 155 of inner member 142, are upper guide strips 185. The guide strips 185, 186 help to maintain the desired spacing between the facing surfaces of the inner and outer members along the flow path.

We claim:

1. A method for removing pollutants from effluent gases by a scrubbing operation, said method comprising the steps of:

providing a pair of separate, discrete, descending, horizontally spaced, facing films of scrubbing liquid defining therebetween an unobstructed, vertically extending flow path substantially devoid of directional change;

backing each of said films with a rigid surface at least vertically and horizontally coextensive with its respective film;

the disposition of said facing films of scrubbing liquid along a horizontal cross-section of said flow path being substantially parallel;

the disposition of said facing films along a vertical cross-section of the flow path being substantially parallel;

flowing said effluent gases downwardly from above said scrubbing liquid and along said flow path between said pair of vertically descending films;

maintaining said effluent gases in intimate concurrent flow with said pair of films of scrubbing liquid along said flow path;

removing said pollutants from said effluent gases to said liquid films during said intimate concurrent flow;

discharging scrubbed gases and scrubbing liquid from the downstream end of said flow path;

separating said scrubbed gases from said scrubbing liquid downstream of said flow path;

and conducting substantially the entirety of the scrubbing operation along said unobstructed flow path defined by said facing films.

2. A method as recited in claim 1 wherein the flow path defined by said films has an annular horizontal cross-section.

3. A method as recited in claim 1 wherein the flow path defined by said films has a rectangular horizontal cross-section.

4. A method as recited in claim 1 wherein said effluent gases are from a sulfonation process and said scrubbing liquid is an alkaline liquid capable of reacting with or absorbing said effluent gases, said method further comprising the steps of:

premixing said effluent gases with steam upstream of said scrubbing zone to form a premixture;

and flowing said premixture into said flow path without further premixing.

5. A method as recited in claim 4 wherein:

said premixing steam is added at a rate in the range 0.1 – 0.9 lbs. of steam to each 100 cubic feet of effluent gases.

6. A method as recited in claim 4 wherein said effluent gases contain solid particles and said discharged scrubbing liquid contains solid particles scrubbed out from said effluent gases, said method comprising:

recycling at least part of said separated scrubbing liquid to the top of said flow path;

regulating the solid particle concentration in said recycled scrubbing liquid to an amount in the range 5–15%;

and controlling the ph of said scrubbing liquid to a pH above 8.

7. A method as recited in claim 6 wherein the pH of said scrubbing liquid is above 10.

8. A method as recited in claim 6 wherein:

said scrubbing liquid comprises an ingredient reactive with said effluent gases to form a detergent; and said method comprises adding soap to said scrubbing liquid as a defoamer.

9. A method as recited in claim 4 wherein:

said scrubbing liquid comprises an ingredient reactive with said effluent gases to form a detergent; and said method comprises adding soap to said scrubbing liquid as a defoamer.

10. A method as recited in claim 1 wherein:

said effluent gases are maintained in said intimate concurrent flow with said films by providing a pres-selected maximum spacing between said rigidly backed films;

said method comprising controlling the pressure drop along said flow path, while maintaining said intimate concurrent flow, by providing a pre-selected minimum spacing between said rigidly backed films;

the removal of said pollutants from said gases being accomplished to the extent desired, without a prohibitive pressure drop along said flow path, by providing a pre-selected minimum length for said films.

11. In a method as recited in claim 10:

providing a pre-selected spacing between said films, within the range 0.25 – 1.5 inches;

and providing a pre-selected length for said films within the range 1.5 – 10 feet.

12. In a method as recited in claim 10:

providing a pre-selected spacing between said films, within the range 0.4 – 1.0 inches;

and providing a pre-selected length for said films within the range 2 – 6 feet.

13. A method as recited in claim 10 and comprising:

adjusting the spacing between said facing films within the range defined by said pre-selected maximum and minimum spacings.

14. A method as recited in claim 1 wherein:

said pollutants in the effluent gases include particulates and said removing step comprises removing said particulates from said effluent gases to said films.

15. A method as recited in claim 14 wherein said pollutants in the effluent gases also include a plurality of fumes, vapors and gases and said removing step comprises removing each of said plurality of pollutant fumes, vapors and gases.

* * * * *

UNITED STATES PATENT AND TRADEMARK OFFICE
CERTIFICATE OF CORRECTION

PATENT NO. : 4,096,236
DATED : June 20, 1978
INVENTOR(S) : Richard J. Brooks et al.

It is certified that error appears in the above-identified patent and that said Letters Patent are hereby corrected as shown below:

Column 5, after line 45 insert the following new sentence, --As seen in the drawing (Figs. 2 and 5), the unobstructed flow path is also substantially devoid of cross-sectional area change, so that there can be no substantial change in velocity of the effluent gases as they flow along the flow path defined between the films.-- Column 8, line 2, after "directional" insert --and cross-sectional area--; column 8, line 14, after "films" insert --without substantially changing the velocity of said gases as they flow along said flow path;--.

Signed and Sealed this

Twenty-seventh Day of February 1979

[SEAL]

Attest:

RUTH C. MASON
Attesting Officer

DONALD W. BANNER
Commissioner of Patents and Trademarks